UNITED STATES PATENT OFFICE.

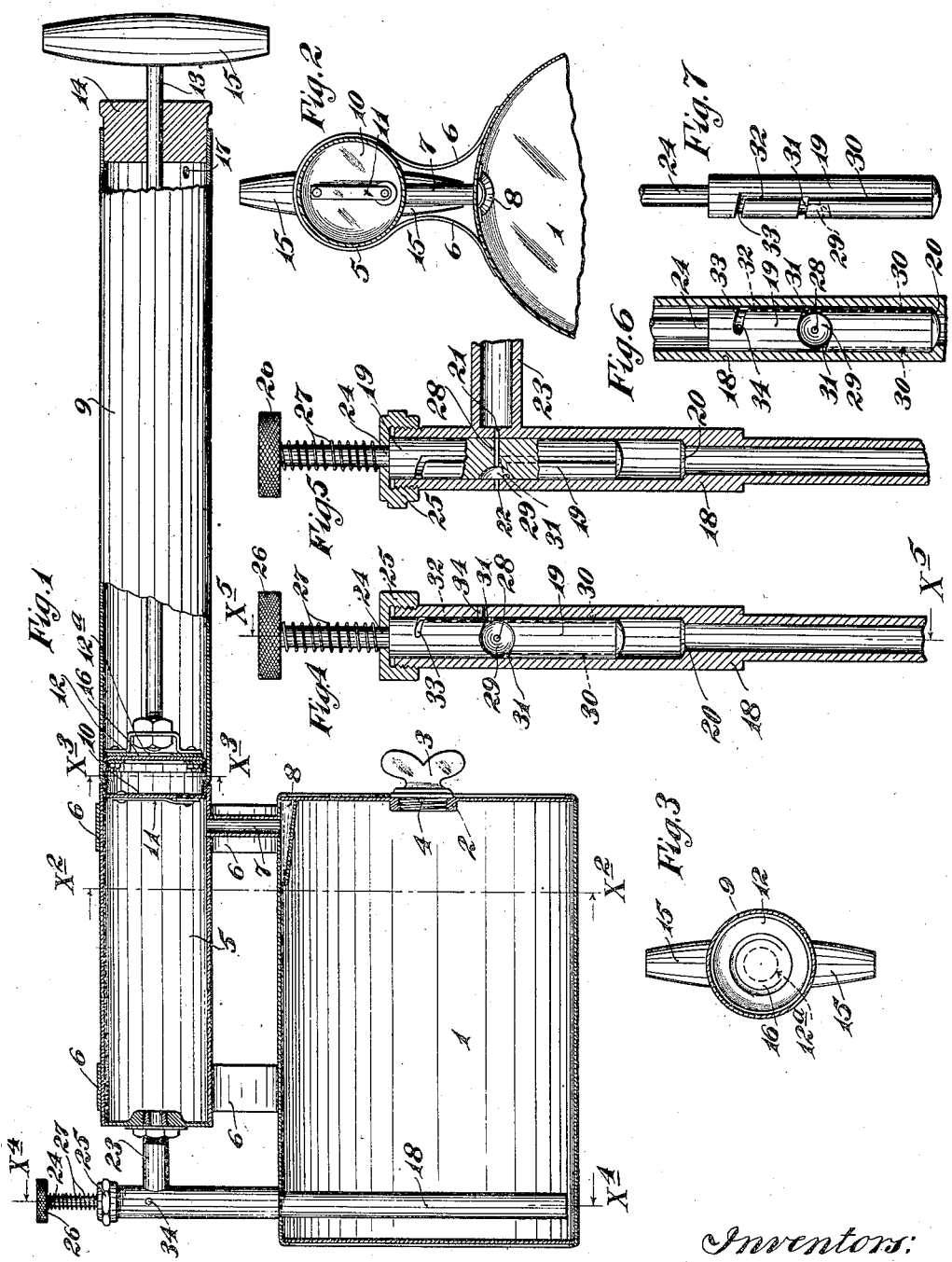

PETTER BRANDT AND HENRY E. BRANDT, OF CHISAGO CITY, MINNESOTA; SAID HENRY E. BRANDT ASSIGNOR OF ONE-FOURTH TO HERBERT D. HUDSON AND ONE-FOURTH TO MILES S. THURBER, BOTH OF MINNEAPOLIS, MINNESOTA.

POISON-DISTRIBUTER.

933,155.  Specification of Letters Patent.  Patented Sept. 7, 1909.

Application filed July 23, 1908. Serial No. 444,900.

*To all whom it may concern:*

Be it known that we, PETTER BRANDT and HENRY E. BRANDT, citizens of the United States, residing at Chisago City, in the county of Chisago and State of Minnesota, have invented certain new and useful Improvements in Poison-Distributers; and we do hereby declare the following to be a full, clear, and exact description of the invention, such as will enable others skilled in the art to which it appertains to make and use the same.

Our invention relates to poison distributers, and has for its object to improve the same in the several particulars hereinafter noted.

The invention consists of the novel devices and combinations of devices hereinafter described and defined in the claims.

In the accompanying drawings, which illustrate the invention, like characters indicate like parts throughout the several views.

Referring to the drawings; Figure 1 is a view partly in side elevation and partly in vertical section showing the improved poison distributer. Fig. 2 is a transverse vertical section, taken on the line $x^2$ $x^2$ of Fig. 1, some parts being broken away. Fig. 3 is a transverse vertical section, taken on the line $x^3$ $x^3$ of Fig. 1. Fig. 4 is a transverse vertical section, taken on the line $x^4$ $x^4$ of Fig. 1, some parts being broken away and some parts being removed. Fig. 5 is a section, taken on the line $x^5$ $x^5$ of Fig. 4. Fig. 6 is a view corresponding in the line of its section to Fig. 5 but showing the controlling valve locked in its closed position, and some parts being broken away; and Fig. 7 is a detail view in side elevation showing the controlling valve removed from working position and with some parts broken away.

The numeral 1 indicates a tank for containing the poisonous liquid which is to be sprayed upon plants for the purpose of destroying noxious insects. This tank, which is preferably cylindrical and is horizontally disposed, is provided in one head with a filling neck 2 that is normally closed by a threaded plug 3 having an air vent 4. To the top of the tank 1 a cylinder which constitutes a pump extension 5 is rigidly connected by brackets 6 and this at one end is connected to the top of said tank by a short tube 7. A guard plate or deflector 8 is secured within the tank just below the lower end of the tube 7, to prevent the poisonous liquid in the said tank from being splashed into the said tube.

The pump cylinder proper 9, at its delivery end, is telescoped into the rear end of the cylindrical extension 5 and is preferably soldered thereto. At its inserted end, the said cylinder 9 is provided with a transverse wall 10 and with a check valve 11 of the flapper type, which valve will open up to permit air to be forced from the cylinder 9 into the cylindrical extension 5 through a passage in said wall 10, but will check a reverse or backward flow.

Working in the pump cylinder 9 is a piston head 12, the stem 13 of which extends outward through a plug 14 in the outer end of said cylinder and is provided with a hand piece 15. The pump piston head 12 has a central passage $12^a$ and it carries a check valve 16 of the flapper type which opens up to permit air to flow through said piston in a direction from the receiving end of the cylinder toward the check valve 11 and cylindrical extension 5, but prevents a backward or reverse flow of the air. As shown, the cylinder 9 is formed in its rear end with one or more air intake ports 17, but any form of passage for permitting atmospheric air to enter the receiving end of said cylinder will answer the purpose.

A liquid delivery tube 18 extends vertically upward through the front end portion of the tank 1, and in the upper end portion of this tube 18 a liquid and air controlling valve 19, of the plunger type, is arranged to work. When this valve 19 is forced downward, its lower end will engage a seat 20 in the tube 18 and thereby close the latter. The extreme lower end of the tube 18 terminates close to the bottom of the tank and a short distance from its extreme upper end it is provided with a small air port 21 and with a diametrically opposite discharge port 22. The air port 21 is connected by a short pipe or tube 23 to the front end of the cylindrical extension 5.

At its upper end, the controlling valve 19 is provided with a stem 24 that works upward through a cap nut 25 on the upper end of the tube 18, and is provided at its extreme upper end with a finger piece shown as in the form of a knurled head 26. A coiled spring 27 which surrounds the stem 24 and is compressed between the cap nut 25 and head 26 tends to hold the valve 19 in its uppermost position. At its intermediate portion, the valve 19 is provided with a small diametrical port 28 which, in the uppermost position of said valve, registers with the air port 21 and alines with the discharge port 22. At the front face of the valve 19, or adjacent to the discharge port 22, the valve port 28 is dished or cut out to form an approximately semi-spherical mixing chamber 29. The controlling valve 19 is formed with longitudinally extended diametrically opposite liquid delivery channels 30, the upper extremities 31 of which open tangentially into the mixing chamber or recess 29 of the said valve. One of the grooves 30 has an upward extension 32, the upper extremity 33 of which extends obliquely part way, to-wit, about 90 degrees, around said valve 19. A cam pin 34, which is applied to and projects inward from the upper portion of the tube 18, works in the grooves 32—33. The groove 32 coöperates with said pin 34 to properly aline the ports 28 and 29 with the ports 21 and 22, respectively, when the valve 19 is in its uppermost position, as best shown in Fig. 5. When the said valve is pressed downward against the tension of the spring 27 and is slightly rotated, the pin 34 enters the oblique upper extremity 33 of the groove 32 and thereby forces the lower end of said valve 18 tightly against the valve seat 20, and, furthermore, locks the said valve 18 in its closed position, in which position, of course, the air supply port 21 will be closed.

The cylindrical extension 5 affords a convenient hand piece, by means of which the device may be supported, or, if desired, said device may be supported by taking directly hold of the pump cylinder 9. Under the action of the pump, when the port 21 is closed, all the air will be pumped into the tank 1, but when the said port 21 is open, air will be supplied directly from the pump to the said port and any surplus supply of air will be delivered into the tank, and the air stored in the tank will afford a supply of air to the cylindrical extension 5 when the pump is not in action or while the piston of the pump is making its return stroke, so that a steady discharge of air will be afforded. In a sense, the so-called cylindrical extension 5 acts as an auxiliary reservoir. The pressure of air in the tank 1 causes the poisonous liquid to flow upward through the pipe or tube 18 when the controlling valve 19 is in its uppermost position, and this liquid will be caused to flow upward through the grooves or channels 30—31 and into the chamber 29 of the said valve 19. The liquid will thus be delivered tangentially into the chamber 29 and a whirling motion will be set up in said chamber which thoroughly commingles the liquid with the air which is forced outward through the ports 21, 28 and 22 and axially through the said chamber 29. In this way, the liquid is thoroughly sprayed and is delivered with considerable force through the discharge port 22.

The entire device is capable of being easily carried in one hand and operated by the other hand, and the spray discharged from the port 22 may be easily directed where desired.

When the tank 1 is to be filled with poisonous liquid, it is set on its front end and the plug 3 is removed, but when it is desired simply to discharge the air from the tank, it is only necessary to slightly unscrew the plug 3 so that air may be discharged through the port 4 of said plug.

The entire device is of simple construction and of small cost; and furthermore, in practice, it has been found highly efficient for the purposes had in view.

What we claim is:—

1. In a liquid spraying device, the combination with a tank and an air pump connected thereto, of a liquid discharge tube extending from said tank, and terminating in a tubular valve casing, an air supply pipe leading from said pump and opening laterally into said tubular valve casing, said valve casing having a lateral discharge port, a plunger valve working in said tubular valve casing and having a diametrical port terminating in a mixing chamber and also having liquid supply channels that open tangentially into said mixing chamber, and a passage through said tubular valve casing adapted to be closed by said valve, when the latter is moved into one extreme position, substantially as described.

2. The combination with a tank, of an air pump, the cylinder of which is rigidly connected and is in communication with said tank, a liquid delivery tube extending upward from the lower portion of said tank and terminating in a valve casing having diametrically alined air inlet and discharge ports, which air inlet port is in communication with said pump cylinder, of a spring pressed plunger valve working in said valve casing, and provided with a diametrical port terminating in a mixing chamber, which diametrical port and mixing chamber are adapted to connect said inlet and discharge ports when said valve is raised, the said valve having a liquid delivery channel that opens tangentially into said mixing chamber, and the said valve further having a longitudinal groove with a laterally extended lock extension, and a lock pin projecting inward from said valve casing and coöperating with the longitudinal portion of said groove to aline the diametrical valve port with said air inlet passage and coöperating with the laterally extended lock extension of said groove to hold the lower end of said valve engaged with the lower extremity of said valve casing, and a projecting stem on said valve by means of which said valve may be moved endwise and oscillated.

3. In a liquid spraying device, the combination with a tank and a pump, the cylinder of which is connected to said tank, of a liquid delivery pipe extending upward from the lower portion of said tank and a valve casing having an air inlet port at one side and a discharge port at its other side, which air inlet port is in communication with the cylinder of said pump, a valve working in said casing and having a diametrical port terminating in a mixing chamber, and the said valve further having a liquid delivery channel that opens tangentially into said mixing chamber, substantially as described.

In testimony whereof we affix our signatures in presence of two witnesses.

PETTER BRANDT.
HENRY E. BRANDT.

Witnesses:
CHARLES A. WALLMARK,
JENNIE WALLMARK.